W H. BAILEY.
PNEUMATIC RAILWAY.
No. 7,503. Reissued Feb. 13, 1877.
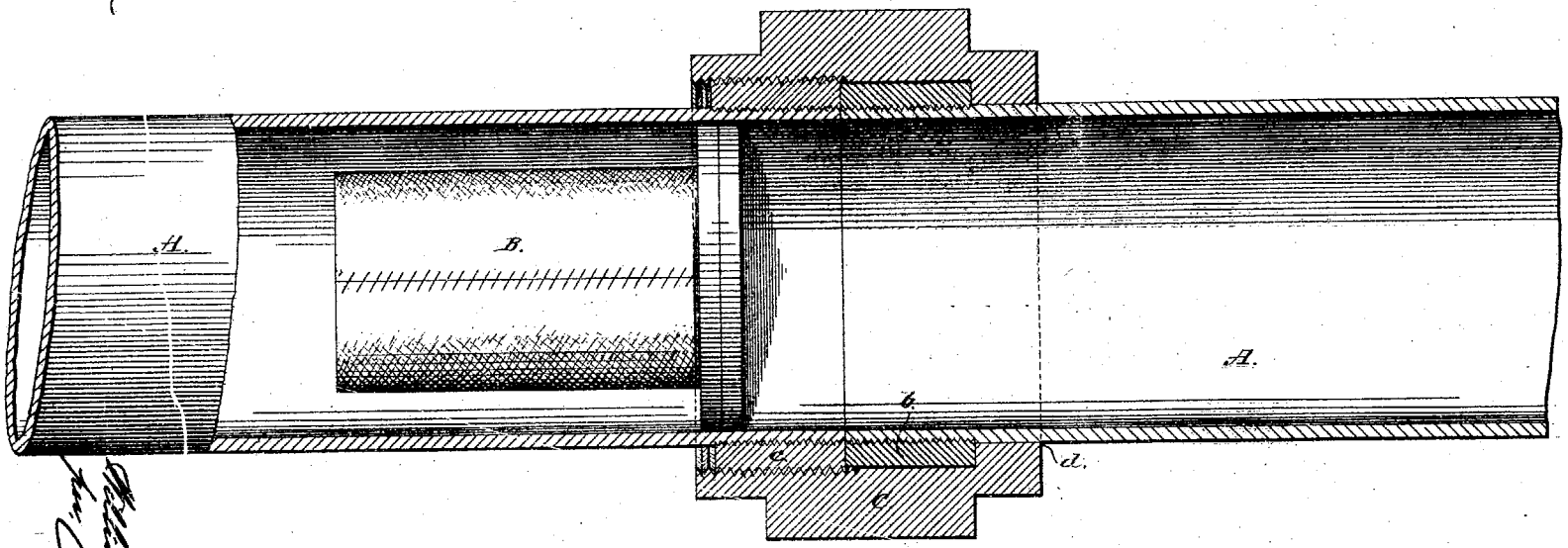
Witnesses:
Geo. R. Graham
F. F. Cornish.
Inventor.
William H. Bailey
per C. H. Forbes.
Attorney.

UNITED STATES PATENT OFFICE.

WILLIAM H. BAILEY, OF NEW YORK, N. Y.

IMPROVEMENT IN PNEUMATIC RAILWAYS.

Specification forming part of Letters Patent No. 182,545, dated September 26, 1876; reissue No. 7,503, dated February 13, 1877; application filed December 16, 1876.

*To all whom it may concern:*

Be it known that I, WILLIAM H. BAILEY, of the city, county, and State of New York, have invented a new and useful Improvement in Pneumatic Railways; and I hereby declare that the following is a full, clear, and exact description of the same, reference being had to the accompanying drawing, forming a part of this specification, in which the figure represents a conductory, shown partly in section to expose the carrier, and a full sectional view of the coupling.

This invention relates to pneumatic railways; and it consists in the combination of a hollow conductory composed of metal that has been drawn or rolled in the direction of the length of said conductory, and a suitable carrier, as hereinafter fully described.

To enable others to manufacture and use my invention, I will proceed to describe a device embodying it.

In the drawing, A A represent the conductory, of circular shape in cross-section, and partly broken away to expose the carrier. B is the carrier, which is usually made of felt, and in the form shown; but it may be made of any suitable material and in any of the known forms. C is the coupling-nut, constructed with a smooth aperture, *d*, about equal in diameter to the external diameter of the conductory, and a threaded chamber to receive the collars *b c*, which are secured to the adjoining ends of the sections The collar *b* is made plain, and reduced in thickness equal to the depth of the external thread upon the adjoining collar *c*, to allow it to pass freely within the threaded chamber of the nut. These collars are secured to the ends of the adjoining sections of the conductory by a fine screw-thread, as shown; but any well-known or equivalent means may be substituted.

When the nut is applied, the inner end of its threaded chamber engages with the edge of the plain collar *b*, and the threaded portion of said chamber with the threaded collar *c* of the adjoining section, and the parts are drawn firmly together. The ends of the sections are made true, and a close joint secured without the use of packing; but packing may be introduced, if necessary.

When the nut is disengaged, it may be moved along the conductory entirely clear of the joint. This forms an essential feature, especially when the conductory is located between the walls of a building or embedded in the ground, as a section may be placed or removed without disturbing either of the sections adjoining.

The conductory is preferably made of brass, which is first cast in suitable molds of the size and form required, and then drawn or rolled in the direction of its length by the process well known in the manufacture of drawn or rolled tubes.

This process of construction produces a conductory embracing many features which are indispensable to its successful use for this purpose, its effect being to dispose the fibers of the metal composing the conductory longitudinally and in the direction traversed by the carrier, and also to render the metal hard and of great density, and yet allow the conductory to be bent to conform to circuitous passages, without annealing. The surfaces are left smooth and highly polished, and require no further finishing, and the friction and consequent evolution of heat caused by the swift passage of the carrier is reduced to a minimum. It produces a perfect shape and uniform diameter, whereby an equal and continuous bearing is maintained between the carrier and conductory, which prevents all leakage of air, and, with a given pressure, a regular and uniform speed is imparted to the carrier, and, when the conductory is constructed in sections, a perfect register at the connections is secured.

I do not, however, herein claim the specific construction of this coupling, although it possesses special advantages for this purpose, as it may be applied for other purposes, and, therefore, I have presented the same in an independent application filed June 9, 1876, and passed for issue September 14, 1876, in accordance with the requirements of the rules of practice in such cases made and provided.

Having thus fully described my invention in the manner in which I prefer to apply it, I do not, however, wish to be confined to the exact process described in the construction of the conductory, as it is obvious that a conductory may be produced from a blank of sheet metal bent to form, and its edges joined by brazing or otherwise, without departing from the spirit of my invention.

What I claim, and desire to secure by Letters Patent, is—

1. The combination of a hollow conductory composed of metal that has been drawn or rolled in the direction of the length of said conductory, and a suitable carrier, for the purpose set forth.

2. A hollow conductory constructed of connected sections composed of metal that has been drawn or rolled in the direction of the length of said conductory, in combination with a suitable carrier, for the purpose set forth.

WILLIAM H. BAILEY.

Witnesses:
JAS. H. REDFIELD,
CHAS. W. FORBES.